United States Patent
Natkins

[11] Patent Number: 6,131,969
[45] Date of Patent: Oct. 17, 2000

[54] CABLE LOCK

[75] Inventor: Ephraim Natkins, Jackson Heights, N.Y.

[73] Assignee: American Casting & Manufacturing Corporation, Plainview, N.Y.

[21] Appl. No.: 09/237,700

[22] Filed: Jan. 26, 1999

[51] Int. Cl.[7] .................................................. B65D 27/30
[52] U.S. Cl. .................... 292/323; 292/307 R; 292/320; 24/136 R
[58] Field of Search ............................. 292/323, 307 R, 292/317, 318, 319, 320, 321, 325, 329; 70/16; 24/136 R, 136 L, 115 H, 115 M

[56] References Cited

U.S. PATENT DOCUMENTS

| | | |
|---|---|---|
| 1,139,595 | 5/1915 | Starr . |
| 1,660,040 | 2/1928 | Lehtonen . |
| 2,544,086 | 3/1951 | Herrington ................................ 24/136 |
| 2,629,155 | 2/1953 | Belpedio .............................. 24/136 R |
| 2,740,654 | 4/1956 | Orschel ................................... 292/321 |
| 3,017,678 | 1/1962 | Christensen ............................... 24/134 |
| 3,744,098 | 7/1973 | Bowers .................................. 24/136 R |
| 3,770,307 | 11/1973 | Van Gompel ....................... 292/307 R |
| 3,994,521 | 11/1976 | Van Gompel ........................... 292/319 |
| 4,049,303 | 9/1977 | Irwin et al. .......................... 292/307 R |
| 4,561,437 | 12/1985 | Kirchner ................................. 128/327 |
| 4,640,538 | 2/1987 | Brammall ............................... 292/323 |
| 4,747,631 | 5/1988 | Loynes et al. ...................... 292/307 R |
| 5,092,641 | 3/1992 | Penick, Jr. .......................... 292/307 R |
| 5,222,776 | 6/1993 | Georgopoulos et al. ............... 292/323 |
| 5,352,003 | 10/1994 | Bystry ..................................... 292/323 |
| 5,533,238 | 7/1996 | Say ......................................... 24/115 F |
| 5,538,300 | 7/1996 | Brown ................................. 292/307 R |
| 5,539,961 | 7/1996 | DeFrance .............................. 24/136 R |
| 5,568,952 | 10/1996 | Ruegg .................................... 292/318 |
| 5,611,583 | 3/1997 | Bystry et al. ....................... 292/307 R |
| 5,647,620 | 7/1997 | Kuenzel .................................. 292/317 |
| 5,820,176 | 10/1998 | Leon et al. ............................. 292/323 |

*Primary Examiner*—B. Dayoan
*Assistant Examiner*—Clifford B Vaterlaus
*Attorney, Agent, or Firm*—Collard & Roe, P.C.

[57] ABSTRACT

A cable lock comprising a housing having two longitudinal channels extending therethrough, a pocket at one end, and a cable having one end permanently locked within one channel. There is a spring disposed within the other channel, a cap disposed in the pocket to retain the spring and a gripping mechanism slidably disposed within the second channel adjacent the spring. The second channel is tapered toward the end nearest the gripping mechanism. The gripping mechanism is a substantially rectangular device having a plurality of gripping teeth arranged in two rows along its top edge to form a plurality of opposing tooth pairs. The gripping mechanism is also tapered to conform to the tapered channel in which it is disposed. There is a longitudinal concave channel for receiving the other end of the cable disposed on the top surface of the gripping mechanism between each pair of teeth and an angled front surface for leading the other end of cable into longitudinal concave channel. The spring exerts a preload on the gripping mechanism and the teeth grip the cable and allow the cable to be inserted into but not removed from the housing. The only way to release the cable from the housing is to cut the cable.

9 Claims, 4 Drawing Sheets

CABLE LOCK

BACKGROUND OF THE INVENTION

1. Field of the Invention

This invention relates to a cable lock for a variety of uses. In particular, this invention relates to a cable lock that allows for insertion but not removal of the cable.

2. The Prior Art

Cable locks are used for a variety of purposes, One use is to lock a device such as a cargo container or a water or electric meter closed. The cable is threaded through the container or meter and then locked in place with a cable lock that cannot release the cable without breaking the lock or cable. This arrangement prevents tampering with the meters, because tampering is easily detected by the presence of a broken or damaged cable or lock.

A cable lock of this type is shown in U.S. Pat. No. 5,611,583 to Bystry et al. This cable lock has a locking mechanism comprised of a spring-loaded disc that is pressed against the cable and prevents backward movement of the cable once it is inserted into the lock. A similar device is shown in U.S. Pat. No. 5,647,620 to Kuenzel, which also uses a spring-loaded disc to prevent release of the cable from the lock. U.S. Pat. No. 3,770,307 to Van Gompel and U.S. Pat. No. 4,049,303 to Irwin et al. also show a disc as the locking mechanism.

U.S. Pat. No. 3,994,521 to Van Gompel discloses a cable lock in which the locking means comprises two spring-loaded ball bearings, which press against the cable to hold it in place. U.S. Pat. No. 5,092,641 to Penick, Jr. discloses another cable lock in which the cable is held in place by a round hasp that is pressed against the cable by a flexible O-ring. U.S. Pat. No. 4,747,631 to Loynes et al. discloses a cable lock that also uses a round hasp to lock the cable in place. In this patent, the hasp is held in place by a leaf spring and a toothed inclined ramp.

Other cable locks and locking devices are shown in U.S. Pat. No. 3,017,678 to Christensen, U.S. Pat. No. 3,744,098 to Bowers, U.S. Pat. No. 1,660,040 to Lehtonen, U.S. Pat. No. 1,139,595 to Starr, and U.S. Pat. No. 2,544,086 to Herrington.

While all of these devices serve to lock cables in place, many of them can be tampered with and released with careful maneuvering of the cables.

SUMMARY OF THE INVENTION

It is therefore an object of the invention to provide a cable lock that is absolutely tamper-evident.

It is another object of the invention to provide a cable lock that is simple and inexpensive to manufacture.

These and other objects are accomplished by a device for locking a steel cable comprising a housing of a softer material such as zinc having two longitudinal channels extending therethrough with one end of the cable permanently locked within one channel. There is a spring disposed within the other channel and a gripping mechanism slidably disposed within the second channel adjacent the spring. The channel having the spring and the gripping mechanism is tapered toward the end opposite the spring. The gripping mechanism is a substantially rectangular device having a plurality of gripping teeth arranged along two longitudinal edges to form a plurality of opposing tooth pairs. The gripping mechanism is also tapered to conform to the tapered shape of the channel in which it is disposed. There is a longitudinal concave channel for receiving the other end of the cable disposed on the top surface of the gripping mechanism between each pair of teeth. The spring creates a preload on the gripping mechanism to keep it near the insertion end of the housing. The teeth grip the cable and allow the cable to be inserted into but not removed from the housing. As tension on the cable is applied in an attempt to remove the cable from the housing, the gripping mechanism slides toward the smaller end of the channel and forces the cable to be gripped even more tightly by the teeth of the gripping mechanism.

The cable is formed of a helix of a number of twisted strands, each strand having a predetermined pitch and each of these strands consisting of an equal number of twisted strands. The teeth on each of the longitudinal edges of the gripping mechanism are separated by a distance equal to the pitch of the strand, so that each tooth embeds itself between two strands of the cable. This arrangement creates an extremely secure grip on the cable, prevents rotation of the cable, and does not let the cable travel back out of the device once it has been inserted. Each tooth has a sloped front wall, a sloped back wall and a flat top surface. The sloped front wall of each tooth has a concave cutout on an edge nearest the longitudinal cavity, so that the cable can easily slide into the device. The rear wall does not have any cutouts, so that rearward tension by the cable causes the cable to become even more securely embedded within the gripping mechanism. The tapered shape of the channel and gripping mechanism also cause the cable to be gripped very tightly by the teeth because the channel compresses the cable into the gripping mechanism as tension is applied to the cable.

The first end of the cable is preferably staked in the first longitudinal channel. The spring is preferably formed from coiled wire and pushes against the gripping mechanism to keep it in place.

The only way to release the cable lock once the cable is inserted into the channel of the gripping mechanism is to cut the cable. Thus, the cable lock according to the invention provides a lock in which any tampering is immediately evident by the presence of the cut cable. The device according to the invention is very simple and inexpensive to produce, so cable locks with cut cables can be easily replaced with new cable locks at a minimal expense.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
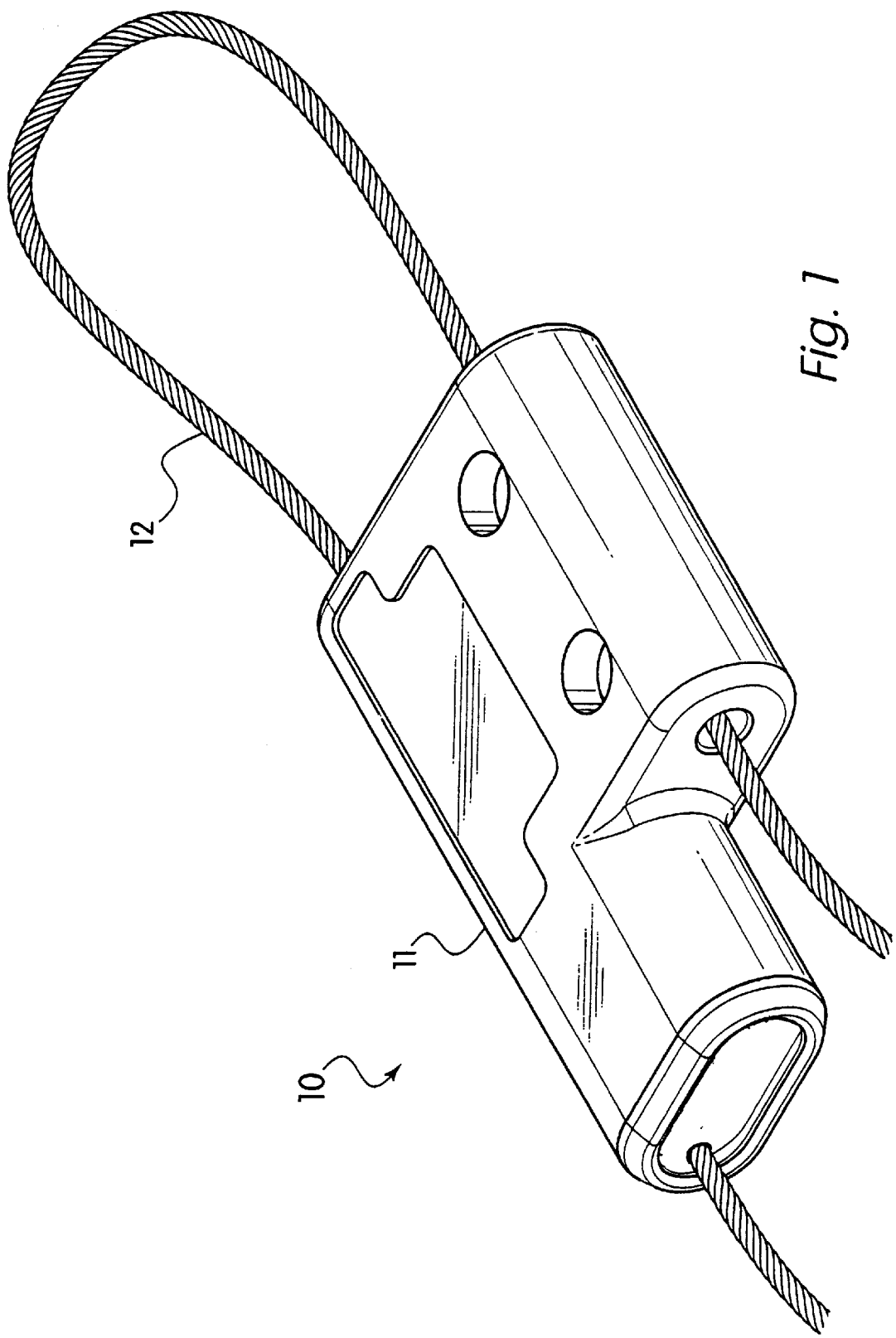
FIG. 1 shows a perspective view of the cable lock according to the invention.
Figure 2:
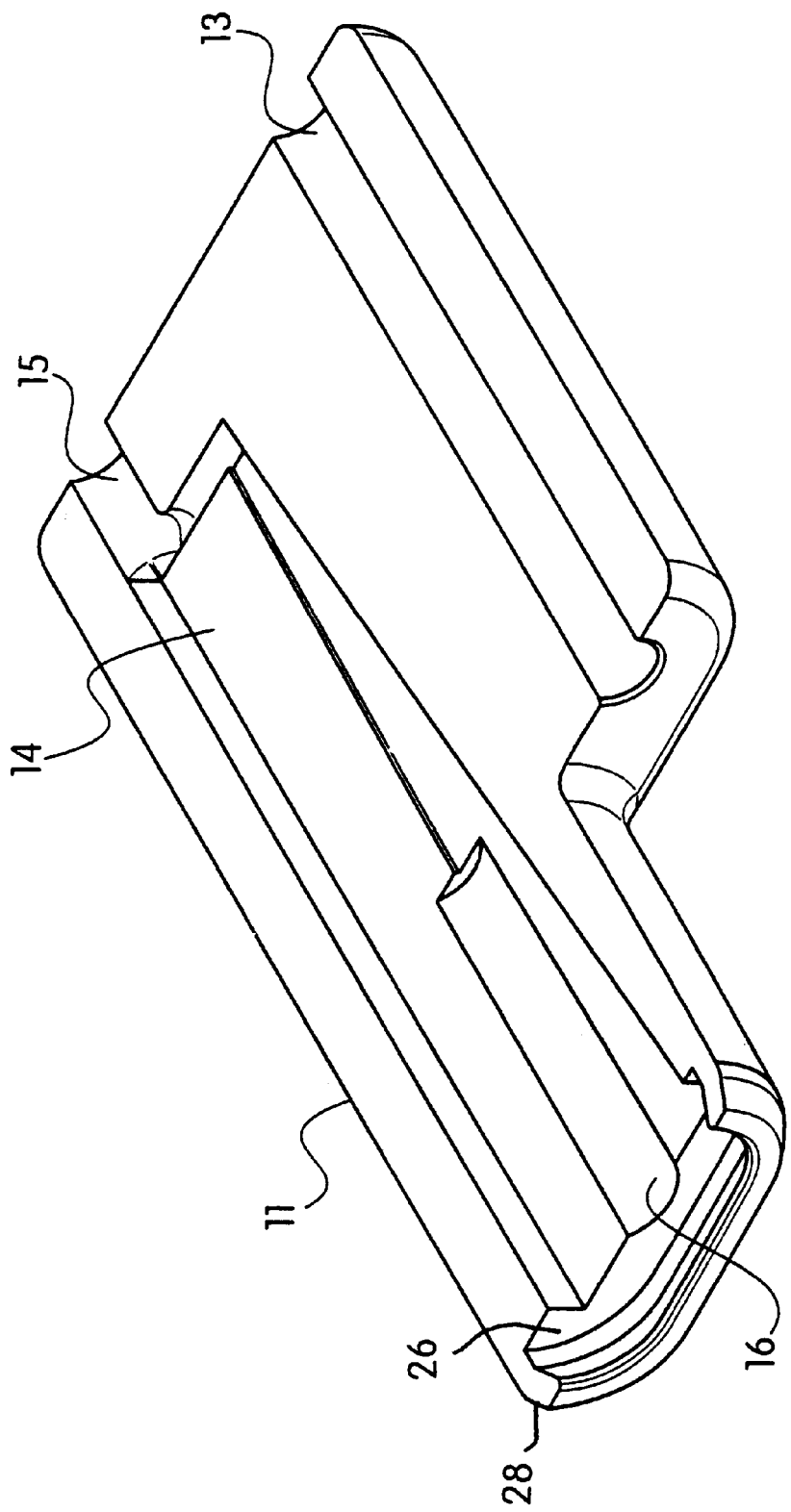
FIG. 2 shows a longitudinal section of the housing of the cable lock according to the invention.
Figure 3:
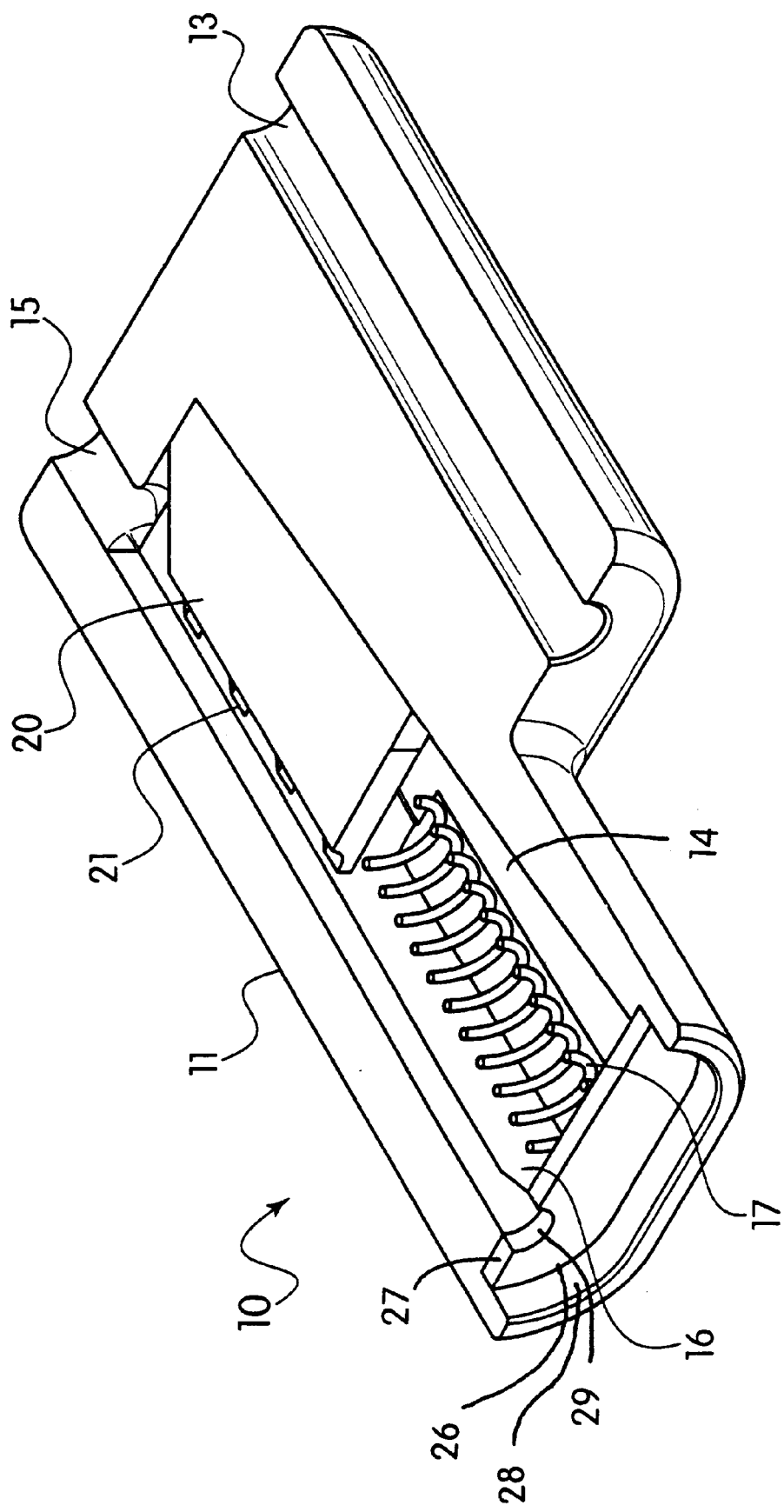
FIG. 3 shows a longitudinal section of the housing having the spring and gripping mechanism inserted therein.

Referring now in detail to the drawings and, in particular, FIGS. 1 and 2, there is shown the cable lock 10 according to the invention. Cable lock 10 is comprised of a housing 11 into which a cable 12 is locked. Housing 11 has two channels 13 and 14 extending therethrough. Channel 14 has an indented portion 16 to accommodate a spring 17 shown in FIG. 3. Channel 14 also has an opening 15 to allow for the insertion of cable 12. Channel 14 is tapered toward opening 15.

At the end of the housing, opposite to the opening 15, is an oval shaped pocket 26. Pocket 26 accommodates a flat steel cap 27 which retains spring 17. Cap 27 is retained by swaging the wall 28 surrounding the oval pocket. Cap 27 also has an opening 29 to allow the exit of the cable.

Figure 4:
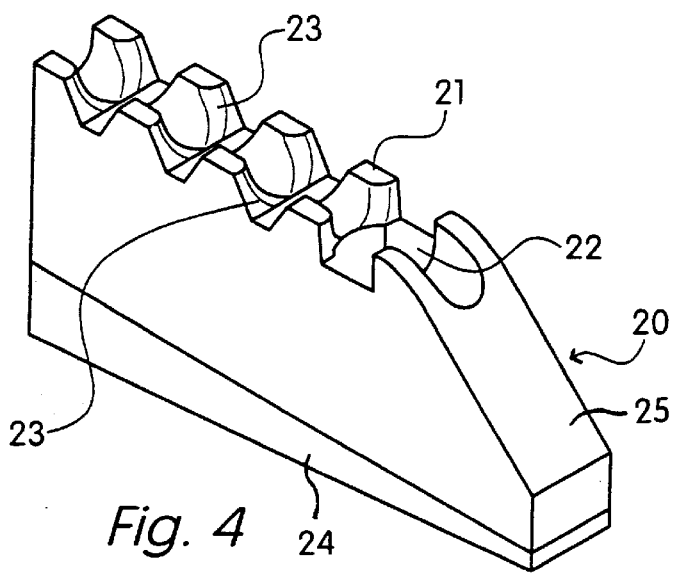
FIG. 4 shows a perspective view of the gripping mechanism.
Figure 6:
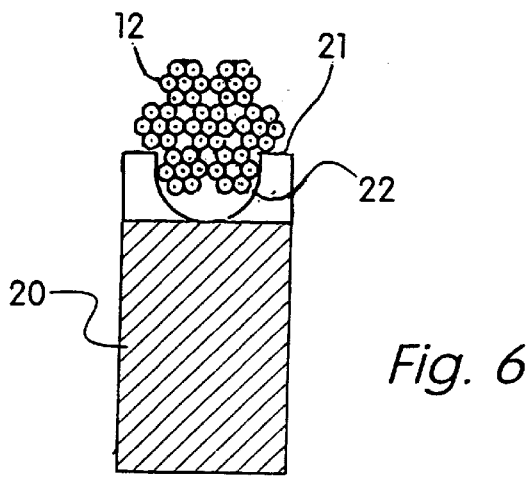
FIG. 6 shows a cross-sectional view of the cable and the gripping mechanism according to the invention.

In use, one end of cable 12 is inserted into channel 13 and is staked in place. A gripping mechanism 20 is inserted into tapered channel 14 adjacent spring 17. Gripping mechanism 20 has a tapered bottom edge 24 to conform to the tapered shape of channel 14. Spring 17 creates a preload and keeps gripping mechanism 20 near opening 15. Gripping mechanism 20 is shown in detail in FIG. 4. Gripping mechanism 20 comprises a plurality of teeth 21 arranged along each longitudinal edge of gripping mechanism 20, and in parallel pairs. Each tooth 21 has a flat top and sloped front and rear faces. The front face of each tooth has a concave cutout 23. The space between each tooth in a pair forms a concave channel 22 for insertion of cable 12, as shown in FIGS. 4 and 6.

Figure 5:
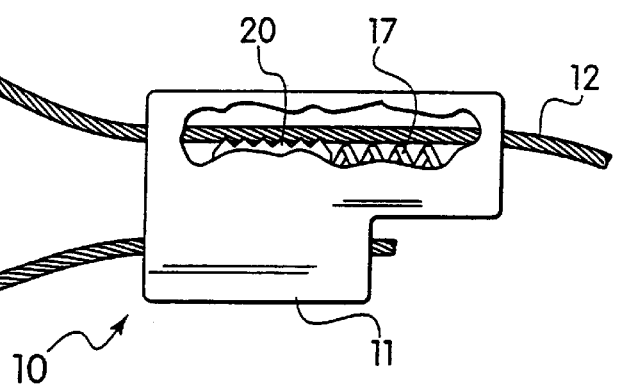
FIG. 5 shows a top view of the device according to the invention with a portion of the housing cut away.

Concave cutout 23 on the front face of each tooth allows cable 12 to slide easily into channel 22, because the resistance formed by the corner of tooth 21 is removed. There is no cutout on the rear face of the tooth, however, so cable 12 becomes embedded in teeth 21 when tension is applied in an attempt to pull cable 12 out of housing 11. Furthermore, as tension is applied to cable 12, gripping mechanism 20 slides toward the smaller end of channel 14 and causes cable 12 to become compressed into teeth 21 to create an even more secure grip. This way, cable 12 can be inserted into but not pulled out of housing 11. Teeth 21 are especially adept at preventing rearward movement of cable 12 because the spacing between each tooth along each of the edges of gripping mechanism 20 is equal to the pitch of each strand in cable 12, as can be seen in FIG. 5. Thus, teeth 21 become embedded in the crevasses between the strands of cable 12 and serve to grip cable 12 even more securely.

The front wall 25 of gripping mechanism 20 is at a 45° angle to the horizontal plane of the teeth 21. This permits easy entry of the cable 12 into the channel 22. The rear wall of gripping mechanism 20 is at a right angle to the horizontal plane of teeth 21.

Accordingly, while only one embodiment of the present invention has been shown and described, it is obvious that many changes and modifications may be made thereunto without departing from the spirit and scope of the invention.

What is claimed is:

1. A cable lock, comprising:

a housing having first and second longitudinal channels therethrough and a pocket having a sidewall at one end;

a cable having one end permanently locked within the first channel, said cable being formed of twisted strands, each strand having a predetermined pitch;

a spring disposed within the second channel;

a gripping mechanism having a top surface, a bottom surface, a back surface, a front surface and two lateral side surfaces and being slidably disposed within the second channel adjacent the spring, comprising:

a plurality of gripping teeth arranged in two rows along the top surface to form at least four opposing tooth pairs; and a longitudinal concave channel for receiving the other end of the cable disposed on the top surface of the gripping mechanism between each pair of teeth, said channel having a depth of approximately half of the diameter of the cable;

wherein the spring exerts longitudinal pressure on the gripping mechanism and wherein the teeth in each row are separated by a distance equal to the pitch of the strand, so that each tooth embeds itself between two strands of the cable and grips the cable and allow the other end of the cable to be inserted into but not removed from the housing.

2. The cable lock according to claim 1, wherein the spring is formed from coiled wire.

3. The cable lock according to claim 1, wherein each tooth has a sloped front wall, a sloped back wall and a flat top surface.

4. The cable lock according to claim 3, wherein the sloped front wall of each tooth has a concave cutout on an edge nearest the longitudinal cavity, so that the cable can easily slide into the device.

5. The cable lock according to claim 1, wherein the second channel is tapered so that an end closest to the spring is wider than an end closest to the gripping mechanism.

6. The cable lock according to claim 1, further comprising a flat cap having a hole therethrough disposed within said oval shaped pocket.

7. The cable lock according to claim 1, wherein the cap is swaged to the sidewall of said pocket.

8. The cable lock according to claim 1, wherein the front surface of the gripping mechanism is disposed at a 45° angle to the top surface of the gripping mechanism.

9. The cable lock according to claim 1, wherein the back surface of the gripping mechanism is disposed at a right angle to the top surface of the gripping mechanism.

* * * * *